Jan. 17, 1956  W. E. GARWOOD ET AL  2,731,458
ALKYLATION OF YELLOW PHOSPHORUS WITH OLEFINS
Filed Dec. 30, 1952
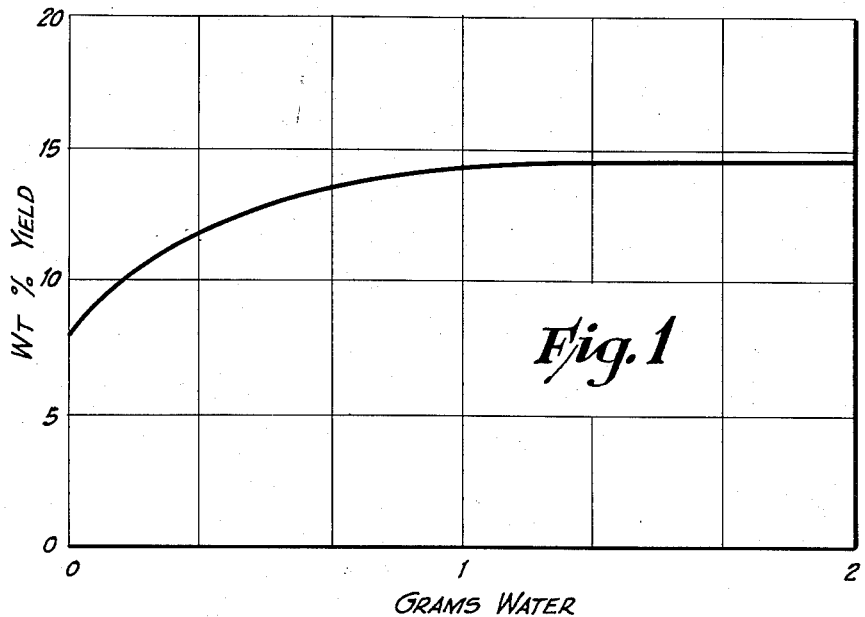
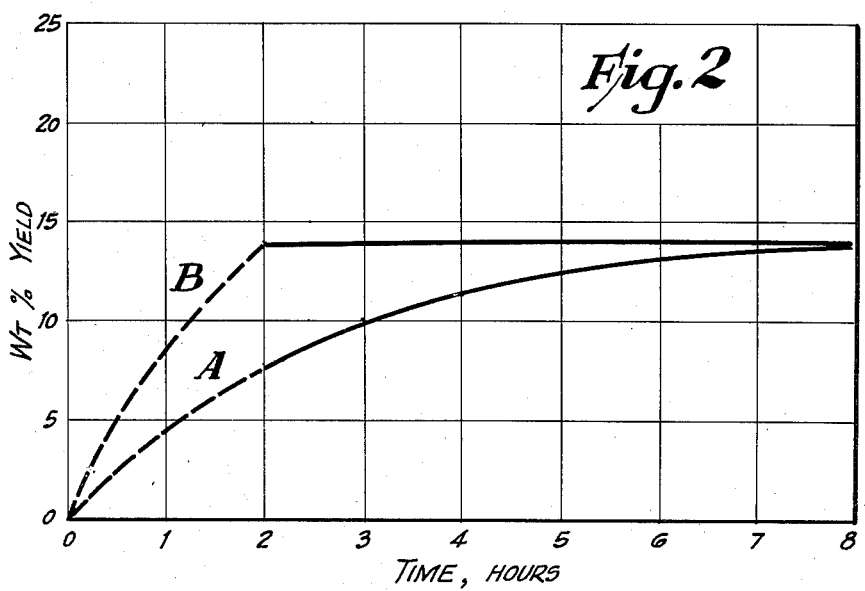
INVENTORS
WILLIAM E. GARWOOD
BY  LYLE A. HAMILTON
ATTORNEY United States Patent Office
2,731,458
Patented Jan. 17, 1956

2,731,458

ALKYLATION OF YELLOW PHOSPHORUS WITH OLEFINS

William E. Garwood, Haddonfield, and Lyle A. Hamilton, Pitman, N. J., assignors to Socony Mobil Oil Company, Inc., a corporation of New York Application December 30, 1952, Serial No. 328,704

15 Claims. (Cl. 260—139)

This invention relates to organic phosphorus compounds. It is more particularly concerned with novel materials produced by the reaction involving yellow phosphorus, olefins, and peroxides, and sulfurized products thereof; and with metal salts of such materials. It is also concerned with hydrocarbon oils containing the same.

As is well known to those skilled in the art, many processes have been proposed for the production of organic phosphorus compounds. Thus, for example, methods have been proposed involving the reactions between phosphorus halides, etc., and various organic compounds. Few methods have been described, however, for the direct addition of elemental phosphorus to organic compounds. Willstätter and Sönnenfeld, Ber. 47, 2801–14 (1914), have proposed a process for reacting olefinic compounds and phosphorus in the presence of oxygen. According to the authors, the process proceeds as follows:

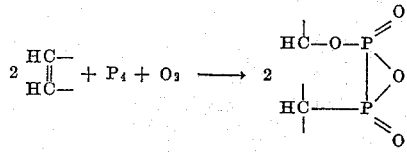

The products of such a reaction, it will be noted, contain a chain of not more than two atoms of phosphorus and have no active, acidic hydrogen atoms. The products are not soluble in petroleum fractions, and therefore, have no utility in mineral oil compositions. In so far as is now known, however, there has been no disclosure of a method for preparing oil-soluble organic phosphorus-containing reaction products having the properties both of a tertiary phosphine and of a weak acid prepared by reacting phosphorus, olefins, and peroxides.

It has now been found that novel organic phosphorus-containing reaction products having the properties both of a tertiary phosphine and of a weak acid can be produced by a simple, feasible process. It has been discovered that by the reaction involving olefins, yellow phosphorus, and peroxides, there are produced novel organic phosphorus-containing reaction products having the aforementioned properties and having phosphorus-phosphorus linkages. Sulfurization of such reaction products produces other valuable products. It has further been discovered that metal salts of such reaction products impart improved characteristics to hydrocarbon fractions, when added thereto in small amounts.

Accordingly, it is an object of this invention to produce a novel, oil-soluble phosphorus-containing reaction product, and derivatives thereof. Another object is to provide a novel method for the production of organic phosphorus-containing reaction products. A specific object is to provide novel, oil-soluble organic phosphorus-containing reaction products having properties both of tertiary phosphines and of a weak acid and having phosphorus to phosphorus linkages; sulfurized derivatives thereof; and metal salts of both products. A further specific object is to provide a process for the production of such products, which involves the reaction between yellow phosphorus, olefins, and peroxides. Another specific object is to provide hydrocarbon fractions containing small amounts of the metal salts of these novel organic phosphorus-containing reaction products, or of the sulfurized derivatives. Other objects and advantages of the present invention will become apparent to those skilled in the art, from the following detailed description.

In general, the present invention provides for a process for preparing organic phosphorus-containing reaction products having the properties both of a tertiary phosphine and of a weak acid and having phosphorus to phosphorus linkages, which comprises reacting an ethylenically-unsaturated hydrocarbon, yellow phosphorus, and an organic peroxide, in a molar proportion of between about 1:0.001:0.001, respectively, and about 1:1:1, respectively, at a temperature of between about 20° C. and about 250° C., and in the absence of oxygen. It also provides sulfurized derivatives thereof and metal salts of the reaction products and of their sulfurized derivatives.

Any olefinically-unsaturated, aliphatic hydrocarbon can be used in the process of this invention. Thus, the hydrocarbon reactant can be a straight-chain, a branched-chain, or a cyclic hydrocarbon having one or more points of ethylenic carbon-carbon unsaturation or mixtures thereof. Especially preferred, however, are the ethylenically-unsaturated, acyclic, aliphatic hydrocarbons having between about 2 and about 18 carbon atoms per molecule, and the terpenes, chiefly due to their availability. Non-limiting examples of the ethylenically-unsaturated hydrocarbon reactant are ethylene; propylene; butene-1; butene-2; isobutylene; isoamylene; isohexenes; hexene-1; hexene-3; 2,4,4-trimethylpentene-1; 2,4,4,6,6-pentamethylheptene-1; octene-2; octene-4; decene-1; decene-5; octadecene-9; tridecene-1; pentadecene-1; hexadecene-1; octadecene-1; tetracontene-1; 2-ethylbutene; 1,-1,2-trimethylethene; 1,1-diethyl-2-methylethene; 2,4,4-trimethylpentene-2; 2,4,4,6,6-pentamethylheptene-2; di-isobutylene; triisobutylene; tetraethylethene; tetra-n-butylethene; tetraisopropylene; butadiene; isoprene; 2,5-dimethyl-3,4-diisopropylhexadiene-2,4; terpinene; camphene; methene; α-pinene; β-pinene; cyclohexene; methylcyclohexene; and cyclopentene.

Of the various forms of phosphorus known, yellow phosphorus is the only form utilizable in the process of this invention. It has been found that other forms of phosphorus, such as red phosphorus, are not operable. As is well-known to those skilled in the art, yellow phosphorus exists as P4, having a tetrahedron molecular structure. Throughout the specification and claims, with respect to amounts of reactants, a mole of phosphorus is considered to be P4. Thus, one gram-molecular weight of yellow phosphorus will be about 124 grams.

Any of the organic peroxides known in the art can be used as the peroxide reactant. Generally, these compounds are known as free-radical reaction initiators. It is to be noted, however, that in the process of this invention the peroxides enter into the reaction itself and fragments thereof appear in the reaction product. Furthermore, free-radical reaction initiators in general are not operable. For example, hydroperoxides and H₂O₂ are not operable in the present process.

For convenience, the organic peroxides can be divided into several classes. In setting forth the following examples of peroxides, a temperature range is given for each class. This range corresponds to the activation temperature for each class of peroxide, which temperature, in turn, governs the reaction temperatures in the present process. Non-limiting examples of organic peroxides are (a) diacyl peroxides at temperatures varying between about 50° C. and about 110° C., such as, dibenzoyl peroxide, lauroyl peroxide, bis(p-chlorobenzoyl) peroxide, bis (2,4-dichlorobenzoyl) peroxide, bis (m-nitrobenzoyl) peroxide, and acetyl peroxide (usually in dimethyl phthalate solution); (b) di-n-alkyl peroxides, such as dimethyl peroxide, diethyl peroxide, and methylethyl peroxide, at temperatures varying between about 20° C. and about 100° C.; (c) disecondary-alkyl peroxides at temperatures varying between about 50° C. and about 130° C., such as diisopropyl peroxide, di-secondary-amyl peroxide, etc., (d) di-t-alkyl peroxides at temperatures varying between about 100° C. and about 200° C., such as, di-t-butyl peroxide, di-t-amyl peroxide, $(CH_3CH_2)_3COOC(CH_2CH_3)_3$, and $$(CH_3)_3CC(CH_3)_2OOC(CH_3)_3$$

Preferred peroxide reactants are the di-t-alkyl peroxides, (d) supra. Di-t-butyl peroxide is especially preferred.

The exact structure of the reaction products of this invention is not determinable by usual methods. For example, no process has been found for reproducing these products by proven methods. Analyses have indicated that the reaction products may comprise mixtures of a number of compounds, which are not readily separable for purposes of individual identification. It has been found that the average empirical analyses and the average molecular weights of the products vary, dependent upon the particular reactants used. Thus, using the same olefinic reactant but varying the peroxide reactants, the reaction products differ. It is to be noted, however, that all of these products are utilizable as described herein. Furthermore, they are all characterized by the dual properties of tertiary phosphines and of weak acids, and by the presence of phosphorus to phosphorus bonds. Accordingly, the most accurate method of defining the reaction products of this invention is by means of a definition reciting the method of making them, coupled with the characterizing properties of a tertiary phosphine and of a weak acid and the presence of phosphorus to phosphorus bonds.

In the case of the reaction product of decene-1, phosphorus, and di-t-butyl peroxide, analyses have indicated that the product comprises chiefly a compound having the formula, $R_6P_4(OH)_2$, wherein R represents a $C_{10}$ radical. It must be strictly understood that analyses indicating this formula are obtained only with this set of reactants, i. e., with decene-1, yellow phosphorus, and di-t-butyl peroxide. When olefins other than decene-1 are reacted under similar conditions with di-t-butyl peroxide and yellow phosphorus, the analyses vary from the formula, $R_6P_4(OH)_2$. Likewise, variations occur when peroxides other than di-t-butyl peroxide are used, even with decene-1.

Several considerations, however, have yielded some insight into the nature of the reaction products of this invention. The presence of the acidic group, —P—OH, is indicated by the ease with which are formed oil-soluble salts, etc., in the general manner of phosphinous or phosphonous acids. If the products are permitted to become oxidized in air (which occurs readily), oil-soluble salts cannot be formed. The tertiary phosphine-like nature of the reaction products is indicated by the formation of a wine-red addition complex with carbon disulfide. This is a well-known characterizing test for tertiary phosphines. Bromine absorption indicates the presence of phosphorus to phosphorus linkages. Infrared adsorption spectra show no ethylenic unsaturation to be present in the reaction product. Yet bromine will add to the reaction product without discoloration.

If oxygen is permitted to enter the reaction vessel, the products of Willstatter et al., supra, will be produced. In the light of the preceding discussion and of the disclosure of the authors, it will be readily appreciated that the reaction products of this invention are different in kind from the products of Willstatter et al.

In order to achieve a product of the type obtained with decene-1, as aforedescribed, it would appear that an approximate stoichiometric molar proportion of unsaturated hydrocarbon to phosphorus (as $P_4$) to peroxide would be 6:1:1, respectively. In order to avoid side reactions, however, molar proportions of between about 1:0.001:0.001, respectively, and about 1:1:1, respectively, are used. It is preferred to operate at a molar proportion of unsaturated hydrocarbon to phosphorus (as $P_4$) to peroxide of about 1:0.01:0.01. As a general rule, the molar ratio of ethylenically unsaturated hydrocarbon to phosphorus is preferably greater than 1:1, in order to minimize the formation of insoluble red compounds of high phosphorus content. In the case of decene-1, when the molar ratio of olefin to $P_4$ is reduced to 12.5, these red solids begin to appear. Also, it is preferred to use a molar ratio of phosphorus to peroxide of 0.5 or higher, in order to prevent peroxide-induced polymerization of the ethylenically-unsaturated hydrocarbon reactant. For each ethylenically-unsaturated hydrocarbon reactant, the optimum molar proportions can be determined readily by means of a few runs. In reacting decene-1, phosphorus, and di-t-butyl peroxide, an optimum proportion has been found to be about 45 moles of ethylenically-unsaturated hydrocarbon: 3 moles of $P_4$:2 moles of peroxide.

The temperature of the reaction between olefin, phosphorus and peroxide is determined by the activation temperature of the organic peroxide reactant. As has been discussed hereinbefore, each type of peroxide has a known range of activation temperatures, for the initiation of free-radical reactions. These are the reaction temperatures contemplated herein. As those skilled in the art will appreciate, the specific activation temperatures of any given peroxide will be known, or readily available, to those familiar with the art. In general, the reaction temperature will be between about 25° C. and about 250° C., and preferably between about 80° C. and about 200° C.

The presence of small amounts of water in the reaction mixture has some effect upon the rate of reaction. The final products, however, are the same, regardless of the presence of water. Accordingly, yellow phosphorus, which is ordinarily stored under water, need not be dried prior to use in the reaction. In Figure 1, there is set forth a curve showing the effect of water upon the yield of product. The data for the curve were obtained from a series of runs each involving 140 grams of decene-1, 5 grams of yellow phosphorus, and 3 grams of di-t-butyl peroxide reacted at 150° C. for 2 hours, with varying amounts of water added. It will be noted that after about one gram of water was added, the yield begins to taper off.

The effect of the addition of water upon the rate of reaction can be seen from the curves set forth in Figure 2. The data for each curve were obtained using the basic reaction mixture as described for Figure 1, reacted at 150° C. for varying periods of time. The runs upon which curve A is based were made in the absence of water. In the runs upon which curve B is based, one gram of water was used. At reaction times up to about 7 hours, the yield of product was greater when water was present in the reaction mixture. However, at about 7 hours reaction time, the yield was the same regardless of the presence or absence of water, with no appreciable increase in yield beyond 7 hours. From the foregoing, it will be apparent that the use of water in the reaction has an effect only upon the rate of reaction. Likewise, the time of reaction affects the yield only, and not the type of product. In general practice, it is preferred to operate for reaction times of between about one hour and about 8 hours. It must be strictly understood, however, that the time of reaction is not considered to be a critical factor.

An important consideration, however, is the exclusion of oxygen from the reaction, as has been indicated hereinbefore. This is achieved by conducting the reaction and handling the products in an anaerobic atmosphere, such as, carbon dioxide, nitrogen, methane, etc.

The product of the present reaction is obtained as the residue after removing unreacted reactants, as by distillation.

The unreacted ethylenically-unsaturated hydrocarbon and phosphorus can be recycled along with additional peroxide. Thus, 100 per cent utilization of the reactants can be achieved by repeated passes through the process. The degradation products of the peroxide reactant can usually be converted back to the corresponding peroxide, by methods well known in the art. Thus, when di-t-butyl peroxide is used, isobutylene is evolved from the reaction mixture. This gaseous olefin can readily be converted to di-t-butyl peroxide by processes described in the literature, such as, by reaction with $H_2SO_4$, followed by $H_2O_2$; or by oxidation with oxygen in the presence of HBr.

The aforedescribed reaction products having the properties of a tertiary phosphine and of a weak acid can be sulfurized to produce valuable reaction products. The sulfurization reaction proceeds smoothly at temperature above 120° C., usually 120–180° C., with little or no heat of reaction. Sulfurization may be effected upon the crude reaction product before the removal of unreacting olefin or phosphorus or it may be effected upon the residual material after removal of unreacted materials. Regardless of which stage product is used for sulfurization, there is no apparent chemical difference in the final sulfurized product. It is usually preferred, however, to sulfurize the crude reaction product because the unreacted olefine acts as a solvent, which greatly facilitates the reaction. Generally the residual reaction product is rather viscous. Therefore, it is preferable to use a non-polar hydrocarbon solvent, such as benzene, toluene, xylene and the like. The ratio of sulfur to phosphorus in the final product, can be any amount up to about 2:1, by varying the amount of sulfur charged. In preferred practice, a ratio of between about 0.5 to 1 and about 2:1 is achieved.

As was the case with respect to the initial reaction product, that is the residual product of this invention, the sulfurized products are initially completely soluble in oil, but come out of solution upon standing. They are also corrosive to copper in the copper strip test. Both difficulties are overcome when the sulfurized products are converted to metal salts.

In order to achieve stable, oil-soluble residual products or sulfurized residual products, it is preferable to convert them to metal salts. The preferred salt-forming metals are metals such as barium, zinc, magnesium, iron, vanadium, potassium, copper, etc. Especially preferred, however, are the metals of group IIA and B of the periodic chart of the elements, particularly barium and zinc.

The metal salts of the initial residual product and of the sulfurized residual product can be produced by any of the methods for salt formation known to the art. It will be noted that these products have the characteristics of weak acids. Accordingly, for example, salts can be produced by first forming a sodium salt and then using a double decomposition reaction; or by reaction with the metal alcoholate, e. g., barium methylate; or even in some instances by direct replacement of acidic hydrogen with metal. In general, it is preferred to use non-polar solvent or even mineral lubricated oil to facilitate the salt formation reaction.

The products described hereinbefore have a wide range of utility. The initial residual reaction product obtained by reacting unsaturated hydrocarbon with phosphorus and organic peroxide, when added to diesel fuels, improve the cetane number thereof to some extent. They also inhibit the auto-oxidation of olefinic hydrocarbon mixtures. Other uses are insecticides, plasticizers, polishing agents, synthetic lubricants, etc. Due to their instability in air, however, the reaction products are most suitable for use as intermediates to produce compounds in which the —POH group is neutralized, as by metal salt formation, and the valence state of the phosphorus atoms is raised from 3 to 5, as by sulfurization. The sulfurized residual products are effective antioxidants for lubricating oils. These reaction products can also be oxidized to form phosphinic and phosphonic acids, which have many valuable uses, e. g., as detergents or wetting agents in the form of the potassium or sodium salt. The metal salts of the residual product and of the sulfurized residual products, such as the barium salts, are effective detergents in mineral lubricating oils.

The amounts of residual products, sulfurized residual products or of metal salts of residual products or of sulfurized residual products which are added to hydrocarbon oils will, in general, vary between about 0.01 per cent by weight and about 49 per cent by weight. It is preferred, however, to use between about 0.1 per cent by weight and about 5 per cent by weight. In some instances, however, it may be desirable and beneficial to use less than about 0.01 per cent by weight and more than about 49 per cent by weight.

The following specific working examples are for the purpose of demonstrating the process of this invention and the novel products produced thereby. It must be strictly understood that this invention is not to be limited by the specific reactants utilized in the examples, or to the operations and manipulations involved. As set forth hereinbefore, a wide variety of other reactants and conditions can be used, as those skilled in the art will readily appreciate.

*Example 1*

A mixture of 280 grams (2 moles) of decene-1 and 5 grams (0.04 mole as $P_4$) of yellow phosphorus was heated with agitation in a reaction vessel in an atmosphere of $CO_2$, for 9.5 hours, at 78–92° C. During the first 4 hours of heating, 36 grams (0.15 mole) of dibenzoyl peroxide were added in three equal portions. The reaction mixture after heating was a clear, pale yellow liquid. It was topped free of unreacted reactants, by subjecting the mixture to distillation under a pressure of 0.6 millimeter at a maximum liquid temperature of 219° C. The residual product weighed 51 grams. It was a deep yellow, viscous liquid having an odor characteristic of phosphines, and having the following analysis:

Kinematic viscosity at 210° F_____cs.___ 264.4
Phosphorus content_____percent__ 8.82
Neutralization number (N. N.)_____ 145

*Example 2*

A mixture of 840 grams (6 moles) of decene-1 and 48 grams (0.375 mole as $P_4$) of yellow phosphorus was heated with agitation in a reaction vessel in a nitrogen atmosphere, for 12 hours at 153° C. During the first hour of reaction, 57.6 grams (0.39 mole) of di-t-butyl peroxide were added in seven portions. A total of 17.4 liters (corrected to STP) of isobutylene were collected during the course of the reaction. The 904 grams of clear, yellow liquid reaction product was topped at 0.7 millimeter pressure at a maximum liquid temperature of 182° C. The yellow, oily residual product, weighing 297 grams, was filtered through filtering clay. This product had the following analysis:

| | Found | Theoretical for $R_6P_4(OH)_2$ |
|---|---|---|
| Percent Phosphorus | 12.2 | 12.41 |
| Percent Carbon | 68.81 | 72.1 |
| Percent Hydrogen | 12.03 | 12.21 |
| Electrometric N. N. | 110.4 | 112 |
| Molecular Weight | 795 | 998 |

Example 3

A mixture of 1700 grams (12.1 moles) of decene-1 and 97 grams (0.76 mole as $P_4$) of distilled yellow phosphorus was heated with agitation in a nitrogen atmosphere in a reaction vessel, for 14 hours at 150° C. During the first hour of reaction, 114 grams (0.78 mole) of di-t-butyl peroxide were added portionwise. A 1120-gram portion of the 1827 grams of reaction product was topped by heating to a liquid temperature of 182° C. under 2.0 millimeters pressure. The residual product (375 grams) was a yellow, oily liquid having the following analysis:

| | |
|---|---|
| Percent phosphorus | 12.5 |
| Percent carbon | 68.59 |
| Percent hydrogen | 11.86 |
| Electrometric N. N. | 126.3 |

Example 4

A mixture of 504 grams (2 moles) of octadecene-1, and 16 grams (0.125 mole as $P_4$) of yellow phosphorus was heated with agitation in a reaction vessel in a nitrogen atmosphere, at 155° C. for 12 hours. During the first hour of the reaction, 19.2 grams (0.13 mole) of di-t-butyl peroxide were added portionwise. The 525 grams of product had suspended therein yellow-orange solids. These solids (245 grams) were removed by filtration. The filtrate, a clear yellow liquid, was topped at a liquid temperature of 225° C. under 0.8 millimeter pressure, yielding 34 grams of yellow-orange waxy residual product. The filter cake from the filtration operation was washed with light petroleum ether, melted, filtered and topped, yielding 46 grams of waxy solids. The petroleum ether washings were freed of solvent, yielding 6 grams of the waxy residual product. The yellow-orange waxy products were combined (total weight, 86 grams) and subjected to analyses. This product analyzed as follows:

| | |
|---|---|
| Percent phosphorus | 9.02 |
| Electrometric N. N. | 101.1 |
| Molecular weight | 940 |

Example 5

A one-half liter stainless steel bomb was flushed with nitrogen gas, and then charged with one gram (0.008 mole as $P_4$) of yellow phosphorus and 6 grams (0.041 mole) of di-t-butyl peroxide. The bomb was sealed and charged with 315 grams of propylene at dry ice-acetone temperature. Then the bomb was heated to 160° C., frequent venting being necessary to maintain the pressure below 3000 pounds per square inch gauge. The temperature was held at 160° C. for two hours, after which time the bomb was allowed to cool overnight. Then, the excess pressure was vented. A yellow liquid reaction product (11 grams) was discharged from the bomb and filtered. This product had the following analysis:

| | |
|---|---|
| Percent phosphorus | 5.19 |
| Percent carbon | 77.10 |
| Percent hydrogen | 13.39 |
| Electrometric N. N. | 37 |
| Molecular weight | 282 |

Example 6

A mixture of 112 grams (1 mole) of octene-1 and 5 grams (0.04 mole as $P_4$) of yellow phosphorus was heated in a reaction vessel, with agitation, at 100° C. for 2 hours, in a nitrogen atmosphere. During the first hour of reaction 20 grams (0.082 mole) of dibenzoyl peroxide were added portionwise. The 136 grams of product was filtered to remove a small amount of white solids, and then it was topped at a liquid temperature of 170° C. under a pressure of 1.3 millimeters. The yellow oily residual product (24 grams) contained 6.71 per cent phosphorus.

Example 7

A mixture of 112 grams (1 mole) of 2-ethylhexene-1 and 5 grams (0.04 mole as $P_4$) of yellow phosphorus was heated in a reaction vessel, with agitation and under a nitrogen atmosphere, at 100° C. for 2 hours. During the first hour of reaction, 20 grams (0.082 mole) of dibenzoyl peroxide were added portionwise. The 137 grams of reaction product was first filtered to remove a small amount of pale orange solids, and then topped at a liquid temperature of 172° C. under 1.7 millimeters pressure. The yellow oily residual product (22 grams) contained 6.97 per cent phosphorus.

Example 8

A mixture of 112 grams (1 mole) of octene-2 and 5 grams (0.04 mole as $P_4$) of yellow phosphorus was heated in a reaction vessel, with agitation, for 2 hours at 100° C., under a nitrogen atmosphere. During the first hour of reaction, 20 grams (0.082 mole) of dibenzoyl peroxide were added portionwise. The 136 grams of product was first filtered to remove a small amount of white solids, and then topped at a liquid temperature of 166° C. under 1.1 millimeters pressure. The residual product (21 grams) was a yellow, oily material containing 6.77 per cent phosphorus.

Example 9

A mixture of 136 grams (1 mole) of α-pinene and 5 grams (0.04 mole as $P_4$) of yellow phosphorus were heated in a reaction vessel, with agitation, for 7.5 hours at 133° C., in a nitrogen atmosphere. During the first hour of reaction, 6 grams (0.041 mole) of di-t-butyl peroxide were added portionwise. The 133 grams of reaction product was first filtered to remove a small amount of orange solids, and then topped at a liquid temperature of 130° C. under a pressure of 0.9 millimeter. The yellow, oily residual product (10 grams) had the following analysis:

| | |
|---|---|
| Percentage phosphorus | 9.40 |
| Molecular weight | 434 |
| Electrometric N. N. | 98 and 125 |

Example 10

A 102-gram portion of the residual product obtained in Example 3 was dissolved in 100 milliliters of benzene. Eighty-nine milliliters of barium methylate solution (containing approximtaely 0.20 gram of barium per milliliter) were added slowly. The reaction mixture warmed slightly due to the exothermic reaction, and an immediate change in color from yellow to light red was noted. The reaction mixture was refluxed at about 61° C. for one hour and then topped to remove the solvent. A viscous product weighing 124 grams was obtained. This material was found to obtain 14.4 per cent barium, 9.76 per cent phosphorus and had an electrometric N. N. (Base No.) of 6.5.

This material was found to have a beneficial effect upon the cetane number of diesel fuel. A distillate diesel fuel of the No. 2 type had a cetane number of 46.8. By the addition of 0.5 weight per cent of the barium salt of this example, the cetane number was increased to 49.7.

When 0.01 weight per cent of this barium salt was added to an olefin stock (bromine No.=143, ASTM boiling range=149–460° F.) obtained by the thermocracking of foots oil, the oxygen bomb induction period was increased from 51 minutes to 89 minutes.

To a portion of an SAE 20 grade motor oil of Pennsylvania origin was blended 2 per cent by weight of the barium salt of this example and 1 per cent by weight of an oxidant (a pinene-$P_2S_5$ reaction product). This blend was run in a single cylinder standard Lauson engine operated at 1825 R. P. M., jacket temperature of 275° F., oil temperature of 225° F., for 60 hours. The following table sets forth the results obtained from this test together with results obtained on this test with the base oil and with the oil containing antioxidant only.

| Oil Blend | Solvent-refined SAE 20 grade oil Penna. Origin | Oil +1% Anti-oxidant | Oil +1% Anti-oxidant +2% Example 10 |
|---|---|---|---|
| Detergency rating | 63 | 59 | 68 |
| Bearing Wt. loss, grams: | | | |
| Top bearing | .383 | .002 | .014 |
| Bottom bearing | .404 | .002 | .002 |
| Oil: | | | |
| N. N. (S. V.) | 3.4 | 1.3 | 1.7 |
| Percent Viscosity increase at 210° F. | 33 | 12 | 11 |

*Example 11*

The barium salt of the product of Example 4 was prepared by dissolving 37 grams of that product in 100 millimeters of benzene and refluxing the solution with 30 milliliters of barium methylate solution (containing approximately 0.2 gram barium per milliliter) at 62° C. for one-half hour. The solvents were removed by distillation leaving 46 grams of a light red, waxy salt containing 13.3 per cent barium and having an electrometric N. N. (Base No.) of 2.2.

A 2 per cent blend of this salt in SAE 20 grade oil of Pennsylvania origin containing one per cent antioxidant was subjected to the Lauson engine test under the conditions described in Example 10. Pertinent results therefor are:

| Oil Blend | Solvent-refined SAE 20 grade oil Penna. Origin | 2% in solvent refined SAE 20 grade oil of Penna. Origin (+1% Antioxidant) |
|---|---|---|
| Detergency rating | 63 | 83 |
| Bearing wt. loss, grams: | | |
| Top bearing | .383 | 0.018 |
| Bottom bearing | .404 | 0.019 |
| Oil: | | |
| N. N. (S. V.) | 3.4 | 2.0 |
| Percent Viscosity increase at 210° F. | 33 | 12 |

*Example 12*

150 grams of the inital reaction product of Example 3, before topping, was heated with 3.2 grams of flowers of sulfur for 7.5 hours, at a temperature of about 172° C., under a nitrogen atmosphere. The very pale brown, almost colorless, product was topped to a liquid temperature of 195° C. under 2.5 millimeters pressure. The 58 grams of oily, very pale brown residual product had an electrometric N. N. of 97.3 and contained 6.11 per cent sulfur.

*Example 13*

A solution of 41 grams of the product described in Example 12 in 50 milliliters of benzene was refluxed with 30 milliliters of barium methylate solution (containing approximately 0.22 gram of barium per milliliter) at 60° C. for one-half hour. The solvents were then removed by distillation leaving 49 grams of light red, viscous product, containing 13.39 per cent barium, and having an electrometric N. N. of 5.8 and 18.2. This product was superior to that of Example 12 in the copper strip test and stayed in solution, i. e., the oil blend remained clear.

Blends of the reaction product of this invention in SAE 10 grade oil of Pennsylvania origin were prepared containing the additive in concentrations of 0.5 per cent, 1 per cent and 2 per cent. Each blend was subjected to an oxidation test wherein a sample of the oil, together with iron wire, copper wire, aluminum wire and lead was placed in a test tube maintained at 260° F. Dry air was passed through each sample at a rate of 10 liters per hour for the duration of the test, 40 hours. Pertinent results of this test are set forth in the following table:

| Concentration in solvent refined SAE 10 grade oil of Penna. origin | 0.0 | 0.5 | 1.0 | 2.0 |
|---|---|---|---|---|
| N. N. (S. V.) | 17.0 | 14.0 | 5.65 | 0.4 |
| Percent Viscosity Increase | 120 | 94.9 | 30.2 | 0.0 |
| Pb loss, mg | 210 | 188.4 | 79.6 | 2.7 |
| Copper strip | Bright | Brassy | Brown stain | Black |
| Sludge | Nil | Nil | Nil | Nil |

*Example 14*

A mixture of 560 grams (4 moles) of decene-1 and 20 grams (0.16 mole) of yellow phosphorus were heated together with stirring at 145° C. for 2 hours under a nitrogen atmosphere. During the first hour of reaction 11 grams (0.075 mole) of di-t-butyl peroxide were added portionwise. The yellow solution was then cooled to about 90° C. and 21 grams (0.65 gram-atoms) of flowers of sulfur were added. The reaction temperature was then raised to 128° C. in 3⅙ hours. The product was then topped to a liquid temperature of 178° C. under 6 millimeters pressure. The 83 grams of clear brown oily residual product had the following analysis:

Percent phosphorus _____ 11.16
Percent sulfur _____ 21.64
Percent carbon _____ 56.25
Percent hydrogen _____ 9.63
Electrometric N. N _____ 84.5

One per cent by weight of this product was blended in a solvent-refined SAE 20 grade oil of Pennsylvania origin. The resultant blend was tested in a single cylinder standard Lauson engine operated at 1825 R. P. M. at a jacket temperature of 212° F. and an oil temperature of 270° F., for 100 hours. Observations were made periodically throughout the duration of the test. Pertinent test results are set forth in the following table:

| Oil Blend | 1% in Solvent Refined SAE 20 Grade Oil of Penna. Origin | | | Solvent Refined SAE Oil of Penna. Origin |
|---|---|---|---|---|
| Hours on Test | 20 | 60 | 100 | 100 |
| Wt. loss, grams: | | | | |
| Top bearing | +.005 | .000 | .006 | .579 |
| Bottom bearing | +.006 | +.003 | +.002 | .434 |
| Detergency rating | 96 | 81 | 74 | 83 |
| Oil: | | | | |
| N. N. (S. V.) | | | 2.3 | 4.8 |
| Percent Viscosity Increase at 210° F | | | 8 | 44 |

From the preceding examples, it will be apparent that the process of this invention provides many novel phosphorus-containing products, sulfurized derivatives, and metal salts. The chain length of the olefinic hydrocarbon reactant can be varied over a wide range, depending upon the ultimate application. Thus, for example, octadecene affords a better detergent barium salt than decene (see Examples 10 and 11). On the other hand a lower molecular weight olefin would be found better in light products.

Although the present invention has been described in conjunction with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for preparing organic phosphorus-containing reaction products having the properties both of a tertiary phosphine and of a weak acid and having phosphorus to phosphorus linkages, which comprises reacting ethylenically-unsaturated hydrocarbon, yellow phosphorus, and an organic peroxide, in a molar proportion of between about 1:0.001:0.001, respectively, and about 1:1:1, respectively, at a temperature of between about 20° C. and about 250° C., and in the absence of oxygen.

2. A process for preparing organic phosphorus-containing reaction products, which comprises reacting ethylenically-unsaturated hydrocarbon, yellow phosphorus and an organic peroxide, in a molar proportion of between about 1:0.001:0.001, respectively, and about 1:1:1, respectively, at a temperature of between about 20° C. and about 250° C., and in the absence of oxygen, to produce a residual product, and sulfurizing said residual product at a temperature of between about 120° C. and about 180° C.

3. A process for preparing organic phosphorus-containing reaction products having the properties both of a tertiary phosphine and of a weak acid and having phosphorus to phosphorus linkages, which comprises reacting ethylenically-unsaturated hydrocarbon selected from the group consisting of unsaturated aliphatic-hydrocarbon having between about 2 and about 18 carbon atoms per molecule and terpenes, yellow phosphorus, and an organic peroxide, in a molar proportion of between about 1:0.001:0.001, respectively, and about 1:1:1, respectively, at a temperature of between about 20° C. and about 250° C. and in the absence of oxygen.

4. A process for preparing organic phosphorus-containing reaction products having the properties both of a tertiary phosphine and of a weak acid and having phosphorus to phosphorus linkages, which comprises reacting decene-1, yellow phosphorus, and di-t-butyl peroxide, in a molar proportion of about 1:0.063:0.064, respectively, at a temperature of about 153° C., and in a nitrogen atmosphere.

5. A process for preparing organic phosphorus-containing reaction products having the properties both of a tertiary phosphine and of a weak acid and having phosphorus to phosphorus linkages, which comprises reacting octadecene-1, yellow phosphorus, and di-t-butyl peroxide, in a molar proportion of about 1:0.065:0.066, respectively, at a temperature of about 155° C., and in a nitrogen atmosphere.

6. A process for preparing organic phosphorus-containing reaction products which comprises reacting octadecene-1, yellow phosphorus and di-t-butyl peroxide, in a molar proportion of about 1:0.065:0.066, respectively, at a temperature of about 155° C. and in a nitrogen atmosphere, to produce a residual product, and converting said residual product to a neutral barium salt.

7. A process for preparing organic phosphorus-containing reaction products which comprises reacting decene-1, yellow phosphorus and di-t-butyl peroxide, in a molar proportion of about 1:0.063:0.064, respectively, at a temperature of about 153° C., and in a nitrogen atmosphere, to produce a residual product and sulfurizing said residual product at a temperature of about 172° C.

8. The process defined in claim 7 further characterized by the additional step of converting the sulfurized residual product to a neutral barium salt.

9. Organic phosphorus-containing reaction products having the properties both of a tertiary phosphine and of a weak acid and having phosphorus to phosphorus linkages, produced by a process which comprises reacting ethylenically-unsaturated hydrocarbon, yellow phosphorus, and an organic peroxide, in a molar proportion of between about 1:0.001:0.001, respectively, and about 1:1:1, respectively, at a temperature of between about 20° C. and about 250° C., and in the absence of oxygen; and the neutral alkaline earth metal salts thereof.

10. Organic phosphorus-containing reaction products produced by a process which comprises reacting ethylenically unsaturated hydrocarbon, yellow phosphorus, and an organic peroxide, in a molar proportion of between about 1:0.001:0.001, respectively, and about 1:1:1, respectively, at a temperature of between about 20° C. and about 250° C., and in the absence of oxygen, to produce a residual product, and sulfurizing said residual product at a temperature of between about 120° C. and about 180° C.; and the neutral alkaline earth metal salts thereof.

11. Organic phosphorus-containing reaction products having the properties both of a tertiary phosphine and of a weak acid and having phosphorus to phosphorus linkages produced by the process which comprises reacting decene-1, yellow phosphorus, and di-t-butyl peroxide, in a molar proportion of about 1:0.063:0.064, respectively at a temperature of about 153° C., and in a nitrogen atmosphere.

12. Organic phosphorus-containing reaction products having the properties both of a tertiary phosphine and of a weak acid and having phosphorus to phosphorus linkages produced by the process which comprises reacting octadecene-1, yellow phosphorus, and di-t-butyl peroxide, in a molar proportion of about 1:0.065:0.066, respectively, at a temperature of about 155° C., and in a nitrogen atmosphere.

13. The neutral barium salt of the reaction product defined in claim 12.

14. An organic phosphorus-containing reaction product produced by a process which comprises reacting decene-1, yellow phosphorus, and di-t-butyl peroxide, in a molar proportion of about 1:0.063:0.064, respectively, at a temperature of about 153° C., and in a nitrogen atmosphere, to produce a residual product, and sulfurizing said residual product at a temperature of about 172° C.

15. The neutral barium salt of the reaction product defined in claim 14.

No references cited.